United States Patent
Chiaki et al.

(10) Patent No.: US 9,704,061 B2
(45) Date of Patent: Jul. 11, 2017

(54) ACCURATELY DETERMINING THE POSITION AND ORIENTATION OF EACH OF A PLURALITY OF IDENTICAL RECOGNITION TARGET OBJECTS IN A SEARCH TARGET IMAGE

(71) Applicant: International Business Machines Corporation, Armonk, NY (US)

(72) Inventors: Oishi Chiaki, Tokyo (JP); Yumi Mori, Tokyo (JP); Hiroki Nakano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/806,095

(22) Filed: Jul. 22, 2015

(65) Prior Publication Data

US 2016/0034760 A1 Feb. 4, 2016

(30) Foreign Application Priority Data

Jul. 31, 2014 (JP) ................................. 2014-156930

(51) Int. Cl.
*G06K 9/00* (2006.01)
*G06K 9/52* (2006.01)
(Continued)

(52) U.S. Cl.
CPC .............. *G06K 9/52* (2013.01); *G06K 9/4604* (2013.01); *G06K 9/6201* (2013.01);
(Continued)

(58) Field of Classification Search
CPC ...... G06K 9/4604; G06K 9/52; G06K 9/6201; G06K 9/6203; G06T 7/004; G06T 7/60; G06T 2207/30242
See application file for complete search history.

(56) References Cited

U.S. PATENT DOCUMENTS 6,711,293 B1    3/2004 Lowe
2006/0072818 A1*    4/2006 Herley ............... G06T 7/12
                                                              382/173
(Continued)

FOREIGN PATENT DOCUMENTS

JP    2984267       11/1999
JP    2984267 B1    11/1999
(Continued)

OTHER PUBLICATIONS

Lowe, David G., Distinctive Image Features From Scale-Invariant Keypoints, International Journal of Computer Vision 60(2), pp. 91-110, 2004.

(Continued)

*Primary Examiner* — Amara Abdi
(74) *Attorney, Agent, or Firm* — Scott S. Dobson

(57) ABSTRACT

Embodiments of the invention relate to detecting the number, position, and orientation of objects when a plurality of recognition target objects are present in a search target image. Dictionary image data is provided, including a recognition target pattern, a plurality of feature points of the recognition target pattern, and an offset $(O_x, O_y)$ from the coordinates at the center of the image to the coordinates of the feature point. The sizes $(R_t)$ and directions $(\theta_t)$ of feature vectors for the coordinates $(T_x, T_y)$ of a plurality of feature points in the target image are also provided. The coordinates $(F_x, F_y)$ of a virtual center point in the target image is derived. Additional virtual center points within a radius of the coordinates $(F_x, F_y)$ is counted. Presence of a recognition target object is recognized near the virtual center point coordinates of the search target image.

8 Claims, 8 Drawing Sheets

(a) Dictionary Image (b) Keypoints

(51) Int. Cl.
*G06K 9/46* (2006.01)
*G06K 9/62* (2006.01)
*G06T 7/60* (2017.01)

(52) U.S. Cl.
CPC .............. *G06K 9/6203* (2013.01); *G06T 7/60* (2013.01); *G06T 2207/30242* (2013.01)

(56) References Cited

U.S. PATENT DOCUMENTS

| | | | | |
|---|---|---|---|---|
| 2007/0104358 | A1* | 5/2007 | Komatsu | G06K 9/4633 382/151 |
| 2008/0170784 | A1 | 7/2008 | Guerzhoy et al. | |
| 2013/0322772 | A1* | 12/2013 | Seo | G06K 9/6203 382/209 |
| 2014/0321759 | A1* | 10/2014 | Kamiya | G06K 9/00993 382/217 |
| 2015/0161468 | A1* | 6/2015 | Higa | G06K 9/4676 382/199 |
| 2016/0034781 | A1 | 2/2016 | Chiaki et al. | |

FOREIGN PATENT DOCUMENTS

| | | |
|---|---|---|
| JP | 2004192506 | 7/2004 |
| JP | 2004192506 A | 7/2004 |
| JP | 2004318627 | 11/2004 |
| JP | 2004318627 A | 11/2004 |
| WO | 2014002554 | 1/2014 |

OTHER PUBLICATIONS

Rublee et al., ORB: An Efficient Alternative to SIFT or SURF, ICCV 2011, pp. 2564-2571.
Lowe, D., "Distinctive Image Features from Scale-Invariant Keypoints", International Journal of Computer Vision 60(2), pp. 91-110, 2004, Copyright Kluwer Academic Publishers.
List of IBM Patents or Patent Applications Treated as Related, dated May 2, 2016, pp. 1-2.
Decision to Grant a Patent, English Translation, Patent Application No. 2014-156930, Drafted on Mar. 17, 2016, 6 pages.
Notification of Reasons for Refusal, English Translation, Patent Application No. 2014-156930, Drafted on Feb. 4, 2016, 6 pages.

* cited by examiner (a) Dictionary Image (b) Keypoints (a) Dictionary Image (b) Result of Object Detection When there are adjacent recognition target objects in a search target image, the adjacent recognition target objects sometimes cannot be differentiated.

Keypoint in Dictionary Image (◉)

Matched Keypoint (◯) and Its Virtual Center Point (●) in Searched Image (a) Dictionary Image (b) Virtual center point (○) circle center point (Mx, My), and orientation of recognition target objects with orientation of line (●)

When there are multiple recognition target objects in a search target image, the center point of each circle is the center point of each recognition target object.

When multiple recognition target objects are adjacent to each other, the center point of each circle is the center point of each recognition target object.

ACCURATELY DETERMINING THE POSITION AND ORIENTATION OF EACH OF A PLURALITY OF IDENTICAL RECOGNITION TARGET OBJECTS IN A SEARCH TARGET IMAGE

CROSS-REFERENCE TO RELATED APPLICATION(S)

This application claims priority under 35 U.S.C. §119 from Japan Patent Application No. 2014-156930, filed on Jul. 31, 2014, the entire contents of which are incorporated by reference herein.

BACKGROUND

The present invention relates to the recognition of objects in images. More specifically, the embodiments relates to detecting the number, position, and orientation of each recognition target object when a plurality of recognition target objects are present in a search target image.

In recent years, object recognition using rotation- and scale-invariant local image features known as keypoints has reached the practical stage. See Lowe, "Distinctive Image Features from Scale-Invariant Keypoints" 2004, hereinafter referred to as Lowe, and Rublee et al., "ORB: An Efficient Alternative to SIFT or SURF" 2011, hereinafter referred to as Rublee et al.

In the technique described in Lowe, known as SIFT, Gaussian filters with different spatial scales are used on images. Differences in the output from filters with adjacent scales are extracted, and image sets known as "Difference of Gaussians" (DoG) are obtained. Coordinates at which the absolute values in a DoG image are at their maximum in both the spatial direction and scale direction are called keypoints, and a plurality of keypoints are usually detected in an image with shading patterns. The orientation of the keypoints is determined from the density gradient of the pixels surrounding the keypoints, and the maximum scale of the DoG is used as the keypoint scale. The pixels surrounding keypoints are divided into 16 blocks, and a shading histogram of the pixels in each block is extracted for use as a feature value of the keypoints.

In SIFT, feature values are expressed as 128-dimensional vectors including a real number element. In the technique described in Rublee et al., known as oFAST, corner portions of shading patterns of pixels are used as keypoints. As in the case of SIFT, oFAST uses both scale and direction. FIGS. 1A and 1B are diagrams showing an example of keypoint detection using the oFAST method of the prior art. In this detection example, the image in FIG. 1A is a dictionary image, and the patterns in the dictionary image are the recognition target objects. The detected keypoints are shown in FIG. 1B. The circle (o) containing cross-hatching are the detected keypoints. The techniques described in both Lowe and Rublee et al. are able to determine with great accuracy whether or not the recognition target objects in a dictionary image are search target images.

However, in situations such as unrecognition of the store products, there may be a plurality of objects present in the search target image. In such situations, the existing techniques can determine whether or not recognition target objects are present. However, the number of recognition target objects, and the position and orientation of each object in the search target image cannot be determined.

SUMMARY

The aspects include a system and computer program product for recognition of one or more objects in an image.

In one aspect, the system is provided to be executed by a computer to determine a recognition pattern present in a target image. The system includes a processing unit operatively coupled to memory. Dictionary image data is including with a recognition target pattern, feature points of the recognition target pattern, including a size ($R_m$) and direction ($\theta_m$) of a feature vector, from coordinates at a center of an image to coordinates of a feature point. In addition, a size ($R_t$) and direction ($\theta_t$) of the feature vector for coordinates ($T_x$, $T_y$) of a plurality of feature points in the target image are provided. The processing unit functions to calculate coordinates ($F_x$, $F_y$) of a virtual center point in the target image derived from $T_x$, $T_y$, $O_x$, $O_y$, $R_m$, $R_t$, $\theta_m$, and $\theta_t$. In addition, the processing unit functions to count additional virtual center points within a predetermined radius (r) of the coordinates ($F_x$, $F_y$) of the virtual center point. The coordinates ($F_x$, $F_y$) of the virtual center point and the number of counted virtual center points are stored in data storage.

In another aspect, the computer program product is provided to determine a recognition pattern present in a target image. The computer program product includes a computer readable storage device with program code executable by a processor. Dictionary image data is provided, including with a recognition target pattern, feature points of the recognition target pattern, including a size ($R_m$) and direction ($\theta_m$) of a feature vector, from coordinates at a center of an image to coordinates of a feature point. In addition, a size ($R_t$) and direction ($\theta_t$) of the feature vector for coordinates ($T_x$, $T_y$) of a plurality of feature points in the target image is provided. The program code calculates coordinates ($F_x$, $F_y$) of a virtual center point in the target image derived from $T_x$, $T_y$, $O_x$, $O_y$, $R_m$, $R_t$, $\theta_m$, and $\theta_t$. In addition, the program code counts additional virtual center points within a predetermined radius (r) of the coordinates ($F_x$, $F_y$) of the virtual center point. The coordinates ($F_x$, $F_y$) of the virtual center point and the number of counted virtual center points are stored by the program code in data storage.

Other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

FIG. 1A is a dictionary image and FIG. 1B shows the detected keypoints.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

The invention disclosed in the present application proposes a technique for detecting the number, position, and orientation of each recognition target object when a plurality of recognition target objects are present in a search target image.

The methods in the existing means used to detect recognition target objects in search target images perform the following steps.

First, keypoints and their feature vectors are obtained from a dictionary image containing a recognition target object, and keypoints and their feature vectors are obtained from the search target image in the same manner. Next, a brute-force method is used to determine the distance between feature vectors on the keypoints in the two images, and to determine pairs of keypoints closest to each other whose separating distance does not exceed a threshold value. These pairs of keypoints are called keypoint pairs.

Figure 1A:
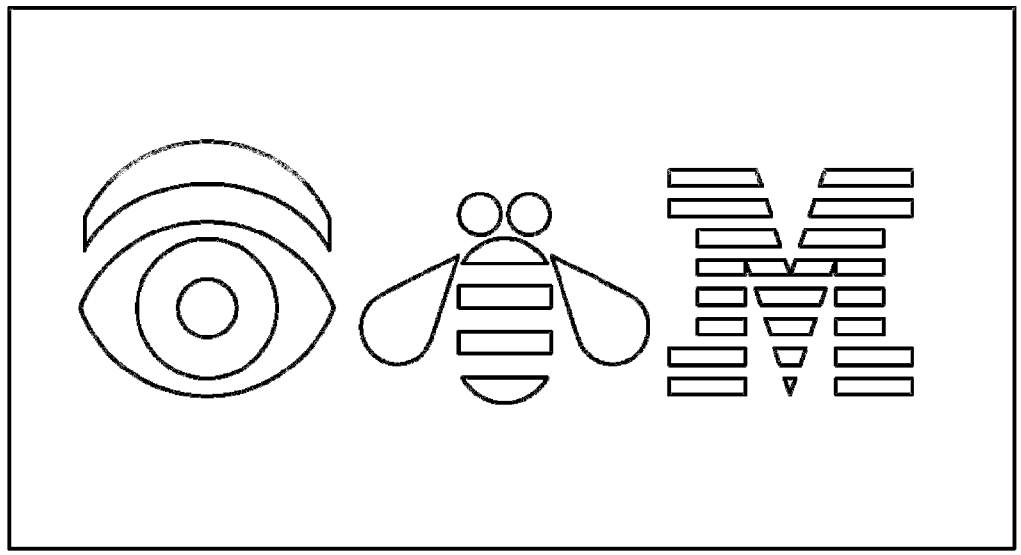
FIGS. 1A and 1B are diagrams showing an example of keypoint detection using the oFAST method of the prior art.
Figure 1B:
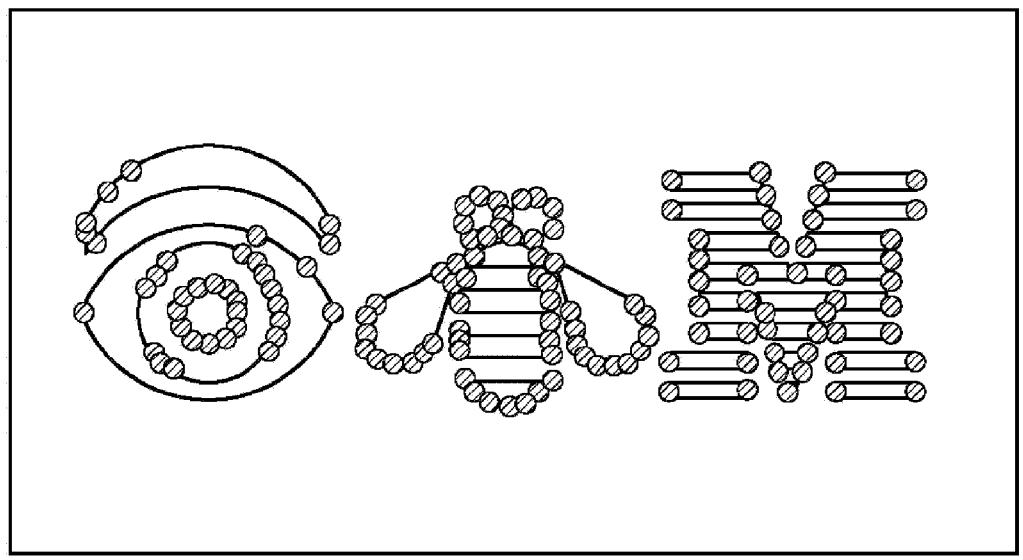
Figure 2A:
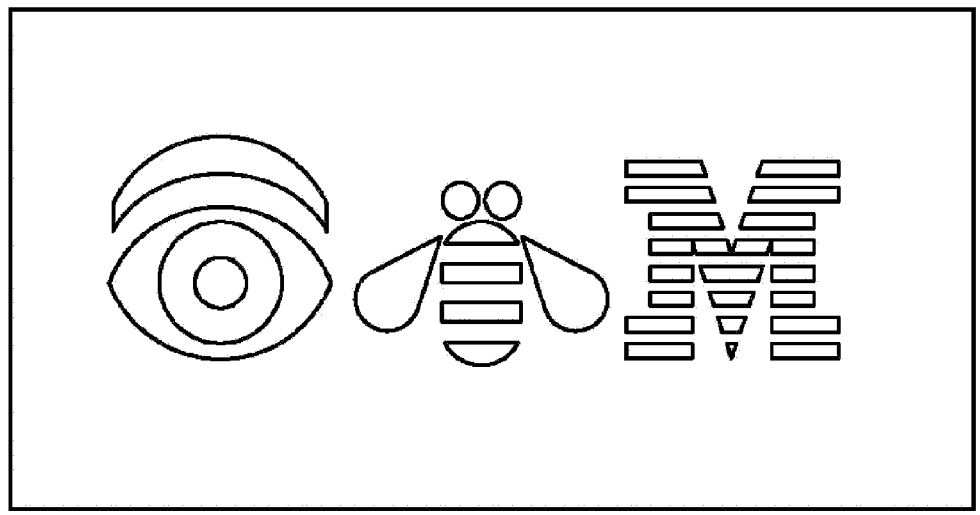
FIG. 2A is a diagram showing the results of detecting a recognition target object from the detected keypoints in the method of the prior art.
Figure 2B:
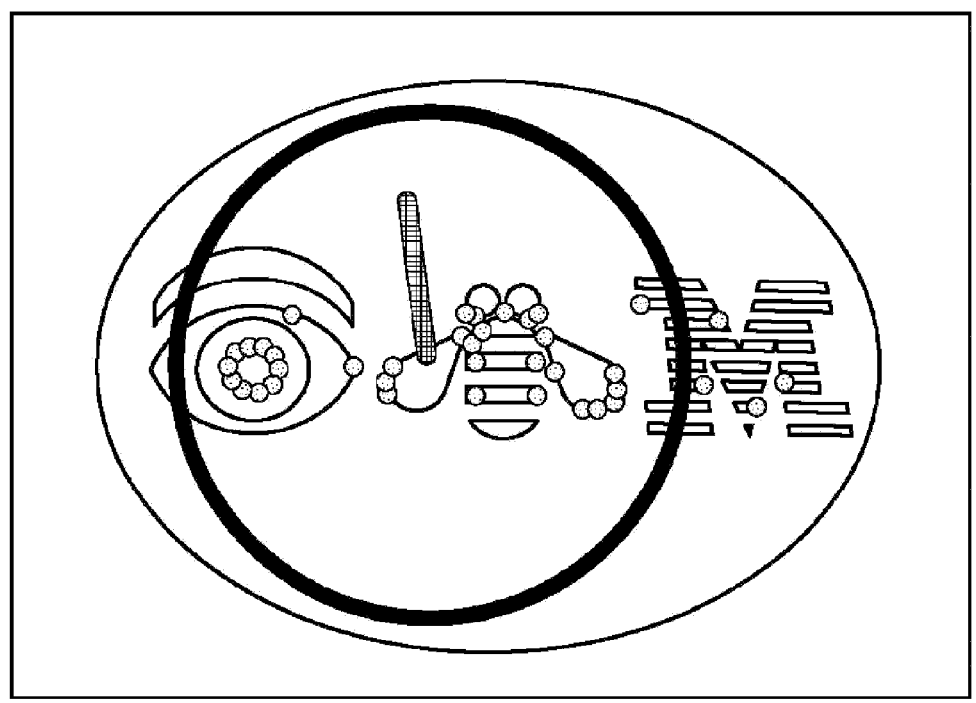
FIG. 2B is a diagram showing a circle centered on the keypoint center-of-gravity coordinates.

FIGS. 2A and 2B are diagrams showing the results of detecting a recognition target object from the detected keypoints in the method of the prior art. When the number of keypoint pairs exceeds a certain threshold value, the center-of-gravity coordinates of the keypoints in the search target image forming keypoint pairs are determined from keypoints detected in the manner shown in FIG. 1B. The circle depicted using bold lines in FIG. 2B is a circle centered on the keypoint center-of-gravity coordinates.

It is then determined that there is a recognition target object around the coordinates. One problem associated with existing means is that the center-of-gravity coordinates are biased in areas with a high concentration of keypoints so keypoints are not necessarily distributed uniformly over recognition target objects. As a result, the center of the dictionary image does not match up with the center-of-gravity coordinates. Thus, these methods cannot be used in applications requiring object position accuracy, such as marking by inkjets, and object picking by robots.

Figure 3:
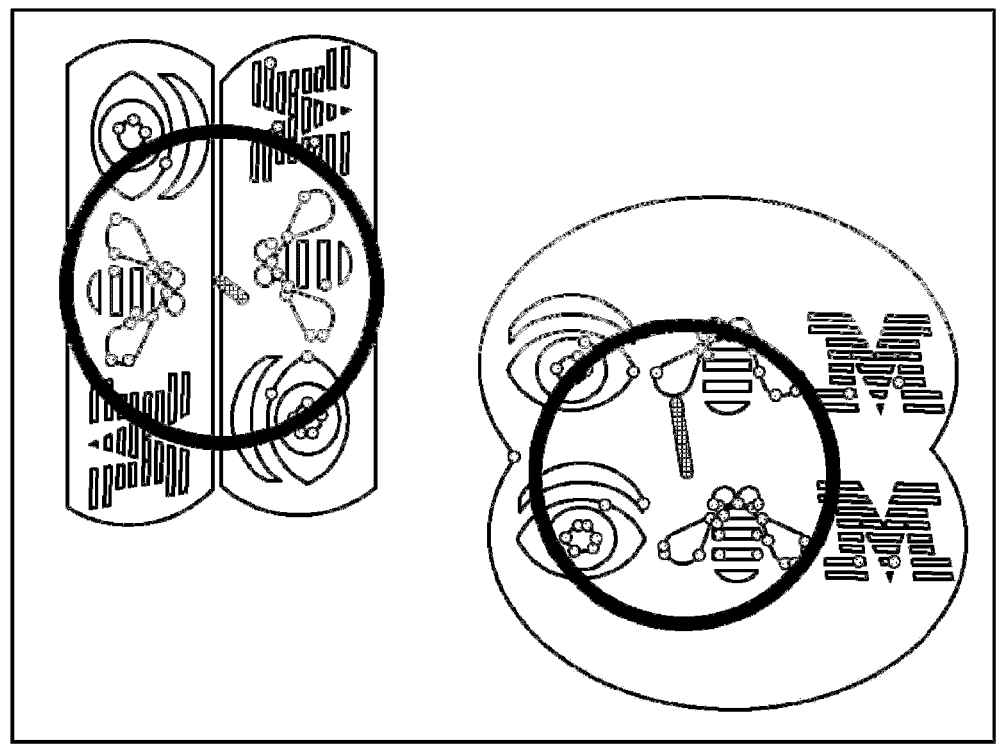
FIG. 3 is a diagram showing the results of detecting a plurality of recognition target objects from a search target image in the method of the prior art.

Another problem associated with prior art is that the number, position, and orientation of objects cannot be detected simply by determining the center-of-gravity coordinates of keypoints when a plurality of recognition target objects are present in a search target area. FIG. 3 is a diagram showing the results of detecting a plurality of recognition target objects from a search target image in the method of the prior art. In the detection results, there are two circles depicted using bold lines for four recognition target objects, and adjacent recognition target objects cannot be differentiated. Methods differentiating objects by limiting the keypoint search range have been considered, but the keypoint search area has to be the same size as the recognition target objects. This makes it difficult to differentiate adjacent recognition target objects when identifying store products (FIG. 3).

Figure 4:
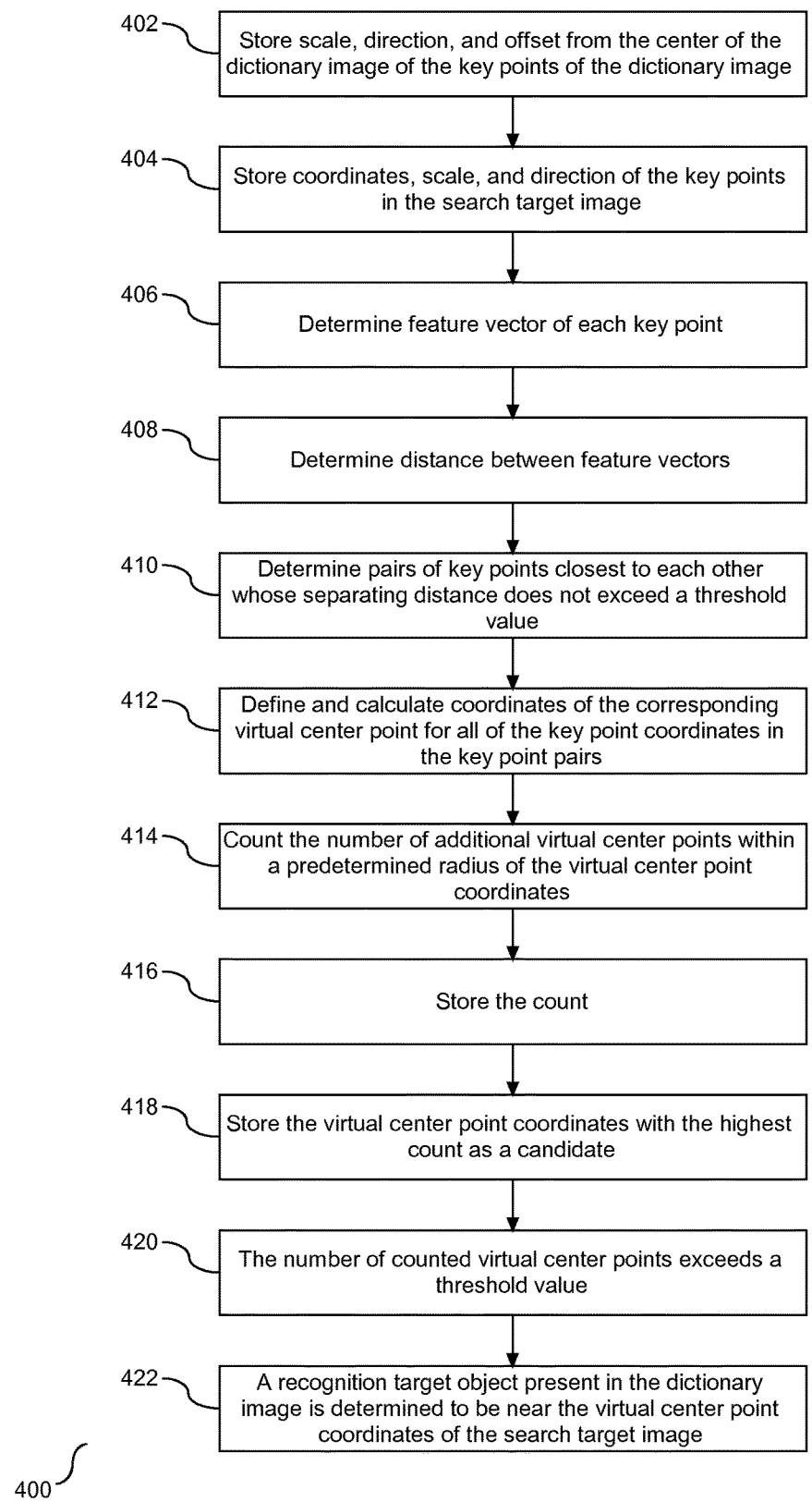
FIG. 4 is a flow chart illustrating the process for converting keypoint coordinates to virtual center point coordinates.
Figure 5:
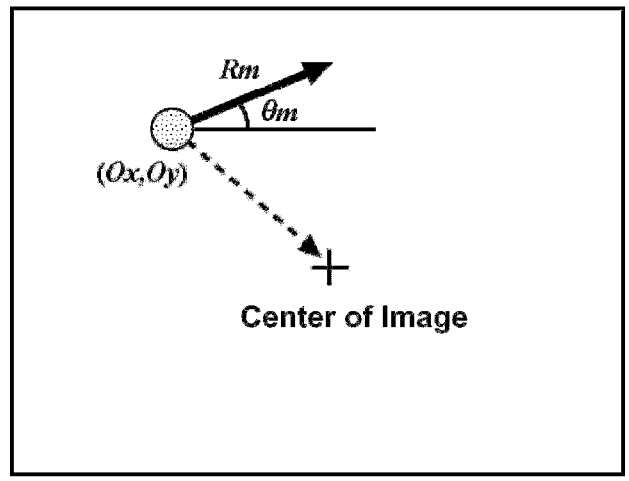
FIG. 5 is a diagram showing a keypoint in a dictionary image when the present invention is applied to coordinate conversion.

The present embodiment(s) proposes a process for converting keypoint coordinates to virtual center point coordinates. Referring to FIG. 4, a flow chart (400) is provided demonstrating the process for converting keypoint coordinates to virtual center point coordinates. FIG. 5 is a diagram showing a keypoint in a dictionary image when the present invention is applied to coordinate conversion. The shaded circles (o) are keypoints.

The scale $R_m$, direction $\theta_m$ [radian], and offset $(O_x, O_y)$ from the center of the dictionary image of the keypoints of the dictionary image are stored (402). All of the parameters can be stored in the memory of the computer serving as the hardware resource in the form of a sequence in the computer program serving as the software resource. The scale of a keypoint is proportional to the size of the object, see FIG. 5. In one embodiment, at step (402) the feature vector of each keypoint is determined and stored.

Similarly, the coordinates $(T_x, T_y)$, scale $R_t$, and direction $\theta_t$ [radian] of the keypoints in the search target image are stored (404). Also, the feature vector of each keypoint is determined. (406) A brute-force method is used on the keypoints in the dictionary image and the search target image to determine the distance between feature vectors (408), and to determine pairs of keypoints closest to each other whose separating distance does not exceed a threshold value (410). These pairs are referred to as keypoint pairs.

Figure 6:
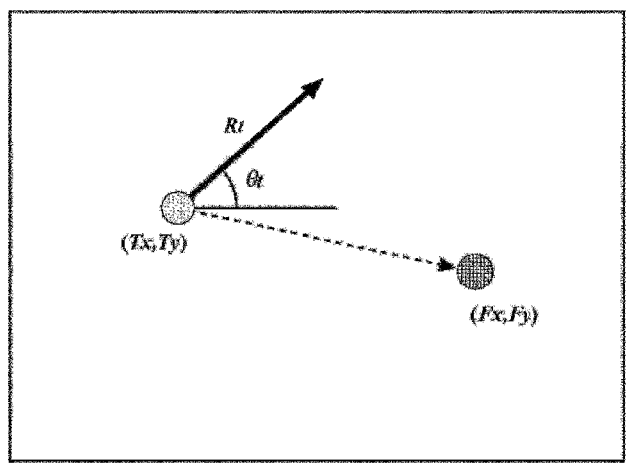
FIG. 6 is a diagram showing a matching point and its virtual center point in a search target image when the present invention is applied to coordinate conversion.

FIG. 6 is a diagram showing a matching point and its virtual center point in a search target image when the present invention is applied to coordinate conversion. The coordinates $(F_x, F_y)$ of the corresponding virtual center point are defined and calculated for all of the keypoint coordinates $(T_x, T_y)$ in the keypoint pairs (FIG. 6) (412) using the following equations:

$$F_x = T_x + (O_x \cdot R_t/R_m)(\cos(\theta_t - \theta_m)) + (O_y \cdot R_t/R_m)(\sin(\theta_t - \theta_m))$$

$$F_y = T_y + (O_x \cdot R_t/R_m)(-\sin(\theta_t - \theta_m)) + (O_y \cdot R_t/R_m)(\cos(\theta_t - \theta_m))$$

As shown in FIG. 6, the shaded circle (o) is a keypoint, and the cross-hatched circle (o) is the virtual center point.

The number of additional virtual center points within a predetermined radius (r) of the virtual center point coordinates ($F_x$, $F_y$) is counted (414), and the count is stored (416). The process shown in steps (414) and (416) is executed on all of the virtual center points, and the virtual center point coordinates ($M_x$, $M_y$) with the highest count are stored as a candidate indicating the possibility of a match with the center of the corresponding dictionary image (418). When the number of counted virtual center points exceeds a predetermined threshold value ($N_c$) (420), it is determined that a recognition target object present in the dictionary image is near the virtual center point coordinates ($M_x$, $M_y$) of the search target image (422). The present embodiment(s) is designed so that, when the search target image includes a recognition target object of the dictionary image, the coordinates of the virtual center point groups of the keypoint pairs are concentrated near the center of the dictionary image.

Figure 7A:
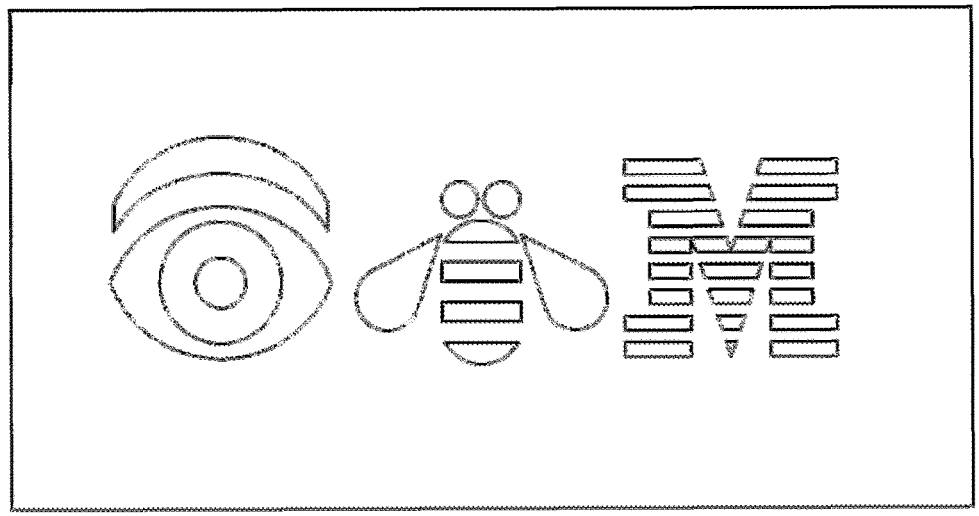
FIG. 7A is a diagram showing the keypoints in a dictionary image.
Figure 7B:
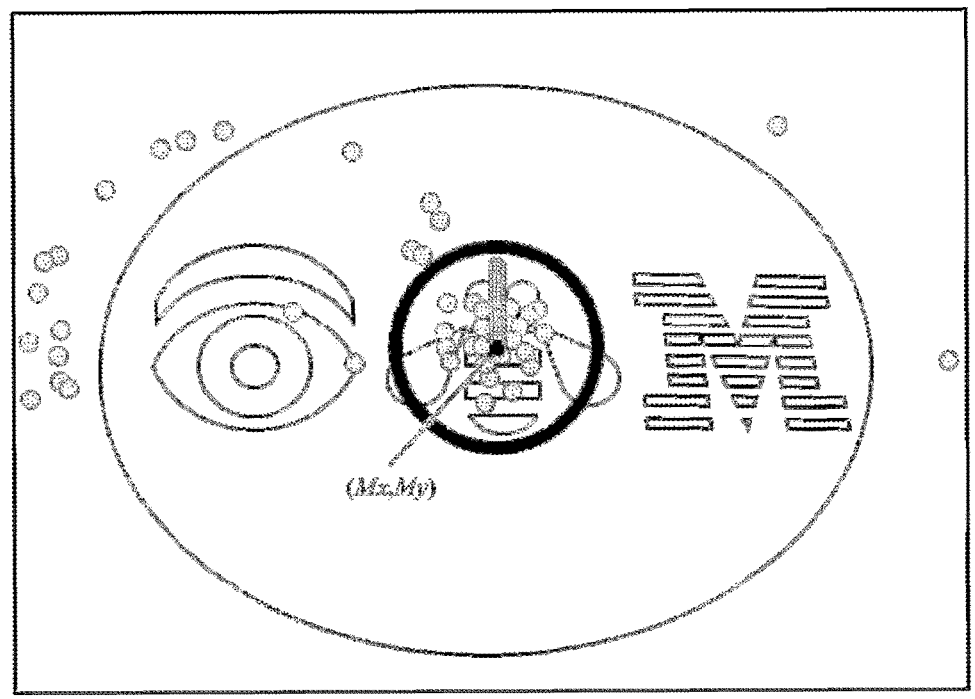
FIG. 7B is a diagram showing the virtual center point of the search target image resulting from the application of the present invention.

The average value of the difference $\theta_t - \theta_m$ between the direction $\theta_t$ [radian] of the keypoints surrounding ($M_x$, $M_y$) and the direction $\theta_m$ [radian] of the keypoints of the corresponding dictionary image is the orientation of the recognition target object in the search target image (FIGS. 7A and 7B). More specifically, FIG. 7A is a diagram showing the keypoints in a dictionary image, and FIG. 7B is a diagram showing the virtual center point of the search target image resulting from the application of the present invention. In FIG. 7B, the center of the circle with the bold line is ($M_x$, $M_y$). Also, as shown in FIG. 7B, the direction of the line with the shaded cross-hatching is the orientation of the recognition target object. The direction of the line shown with the cross-hatching indicates the 1200 (0000) direction of a clock hand from the center ($M_x$, $M_y$) of the circle with the bold line.

Figure 8:
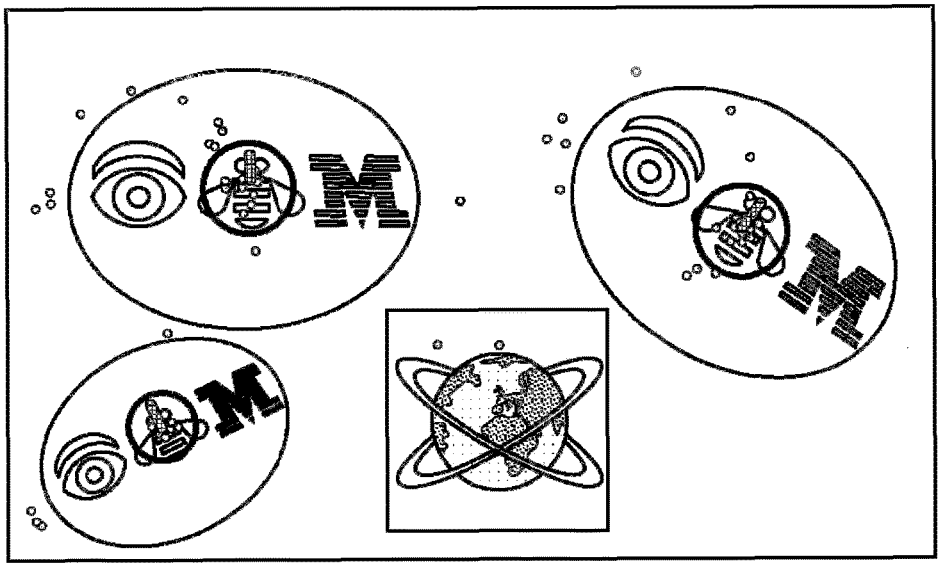
FIG. 8 is a diagram showing the results of applying the present invention when a plurality of recognition target objects are present in a search target image.

FIG. 8 is a diagram showing the results of applying the present invention when a plurality of recognition target objects are present in a search target image. When the search target image includes a plurality of recognition target objects, the virtual center point group is concentrated on a plurality of coordinates (FIG. 8). The number is the number of recognition target objects, and each group of virtual center point coordinates ($M_x$, $M_y$) corresponds to the center of a dictionary image. When the search target image includes a plurality of recognition target objects, the center of each circle is the center of a recognition target object.

Figure 9:
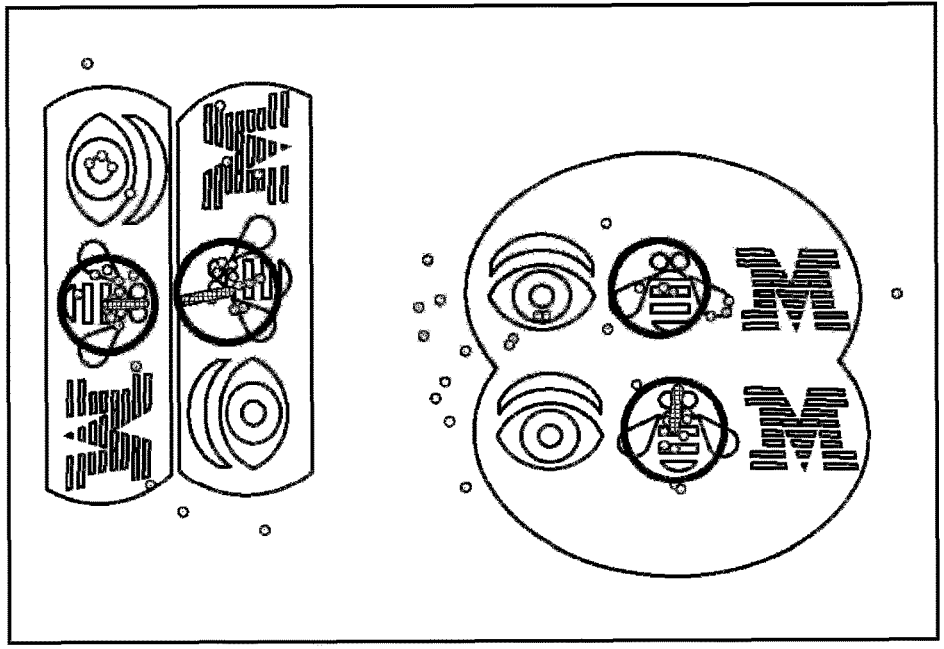
FIG. 9 is a diagram showing the results of applying the present invention when a plurality of recognition target objects are adjacent to each other.

FIG. 9 is a diagram showing the results of applying the present invention when a plurality of recognition target objects are adjacent to each other. The number of recognition target objects and the virtual center point coordinates ($M_x$, $M_y$) of each recognition target object can be correctly determined even when a plurality of recognition target objects are adjacent to each other (FIG. 9). When a plurality of recognition target objects is adjacent to each other, the center of each circle is the center of a recognition target object.

The characteristics of the technical idea of the present invention explained above can be realized as a technique (method, system, computer program) executed by a computer. All of the operations, including providing dictionary image data, calculating the coordinate conversion, counting the virtual center points, and storing the counted number, can be executed by a computer. Extraction of keypoints, representation of the feature values as vectors, and the storage of these can be performed very efficiently using a computer. The present invention demonstrates accurately calculating the position and orientation of each of a plurality of recognition target objects when a plurality of identical recognition target objects are present in a search target image.

Figure 10:
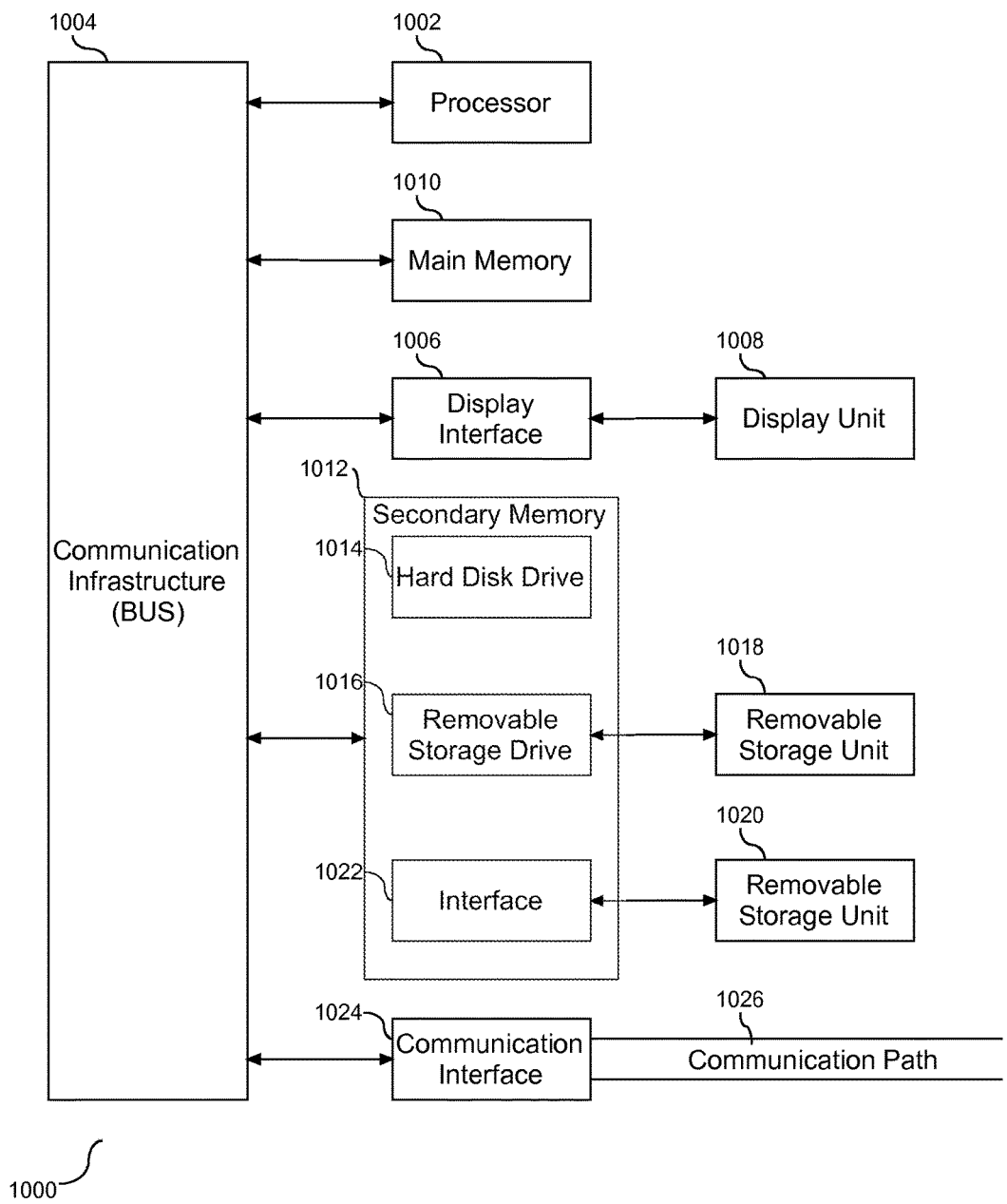
FIG. 10 depicts a block diagram of a computer system and associated components for implementing an embodiment.

Referring now to the block diagram of FIG. 10, additional details are now described with respect to implementing an embodiment. The computer system includes one or more processors, such as a processor (1002). The processor (1002) is connected to a communication infrastructure (1004) (e.g., a communications bus, cross-over bar, or network).

The computer system can include a display interface (1006) that forwards graphics, text, and other data from the communication infrastructure (1004) (or from a frame buffer not shown) for display on a display unit (1008). The computer system also includes a main memory (1010), preferably random access memory (RAM), and may also include a secondary memory (1012). The secondary memory (1012) may include, for example, a hard disk drive (1014) and/or a removable storage drive (1016), representing, for example, a floppy disk drive, a magnetic tape drive, or an optical disk drive. The removable storage drive (1016) reads from and/or writes to a removable storage unit (1018) in a manner well known to those having ordinary skill in the art. Removable storage unit (1018) represents, for example, a floppy disk, a compact disc, a magnetic tape, or an optical disk, etc., which is read by and written to by removable storage drive (1016).

In alternative embodiments, the secondary memory (1012) may include other similar means for allowing computer programs or other instructions to be loaded into the computer system. Such means may include, for example, a removable storage unit (1020) and an interface (1022). Examples of such means may include a program package and package interface (such as that found in video game devices), a removable memory chip (such as an EPROM, or PROM) and associated socket, and other removable storage units (1020) and interfaces (1022) which allow software and data to be transferred from the removable storage unit (1020) to the computer system.

The computer system may also include a communications interface (1024). Communications interface (1024) allows software and data to be transferred between the computer system and external devices. Examples of communications interface (1024) may include a modem, a network interface (such as an Ethernet card), a communications port, or a PCMCIA slot and card, etc. Software and data transferred via communications interface (1024) is in the form of signals which may be, for example, electronic, electromagnetic, optical, or other signals capable of being received by communications interface (1024). These signals are provided to communications interface (1024) via a communications path (i.e., channel) (1026). This communications path (1026) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1010) and secondary memory (1012), removable storage drive (1016), and a hard disk installed in hard disk drive (1014).

Computer programs (also called computer control logic) are stored in main memory (1010) and/or secondary memory (1012). Computer programs may also be received via a communication interface (1024). Such computer programs, when run, enable the computer system to perform the features of the present embodiment(s) as discussed herein. In particular, the computer programs, when run, enable the processor (1002) to perform the features of the computer system. Accordingly, such computer programs represent controllers of the computer system.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the $$Fx=Tx+(Ox\cdot Rt/Rm)(\cos(\theta t-\theta m))+(Oy\cdot Rt/Rm)(\sin(\theta t-\theta m))$$

$$Fy=Ty+(Ox\cdot Rt/Rm)(-\sin(\theta t-\theta m))+(Oy\cdot Rt/Rm)(\cos(\theta t-\theta m)).$$

We claim:

1. A system executed by a computer to determine a recognition target pattern present in a target image, the system comprising:
   - a processing unit operatively coupled to memory;
   - dictionary image data including a recognition target pattern, a plurality of feature points of the recognition target pattern including a size (Rm) and direction (θm) of a feature vector, and an offset (Ox, Oy) from coordinates at a center of an image to coordinates of a feature point;
   - sizes (Rt) and directions (θt) of feature vectors for coordinates (Tx, Ty) of a plurality of feature points in the target image;
   - the processing unit to calculate coordinates (Fx, Fy) of a virtual center point in the target image derived from Tx, Ty, Ox, Oy, Rm, Rt, θm, and θt;
   - the processing unit to count additional virtual center points within a radius (r) of the coordinates (Fx, Fy) of the virtual center point; and
   - data storage to store the coordinates (Fx, Fy) of the virtual center point and the number of counted virtual center points as candidates, wherein each feature point in the plurality of feature points in the target image is a matching feature point of at least one feature point in the target image and at least one feature point in the recognition target pattern.

2. The system of claim 1, further comprising establishment of the coordinates (Fx, Fy) of the virtual center point of a maximum number of counted virtual center points as the center of the recognition target image.

3. The system of claim 2, further comprising establishment of the coordinates (Fx, Fy) as one recognition target image center and eliminating all of the virtual center points within a predetermined radius (r) of the coordinates (Fx, Fy).

4. The system of claim 1, wherein calculation of the coordinates of the virtual center point in the target image uses the following equations:

5. A computer program product to determine a recognition target pattern present in a target image, the computer program product comprising a non-transitory computer readable storage device having program code therein, the program code being executable by a processor to:
   - provide dictionary image data including a recognition target pattern, a plurality of feature points of the recognition target pattern including a size (Rm) and direction (θm) of a feature vector, and an offset (Ox, Oy) from coordinates at a center of a target image to coordinates of a feature point;
   - provide a size (Rt) and direction (θt) of the feature vector for coordinates (Tx, Ty) of a plurality of feature points in the target image;
   - calculate coordinates (Fx, Fy) of a virtual center point in the target image derived from Tx, Ty, Ox, Oy, Rm, Rt, θm, and θt;
   - count a number of additional virtual center points within a predetermined radius (r) of the coordinates (Fx, Fy) of the virtual center point; and
   - store the coordinates (Fx, Fy) of the virtual center point and the number of counted virtual center points, wherein each feature point in the plurality of feature points in the target image is a matching feature point of at least one feature point in the target image and at least one feature point in the recognition target pattern.

6. The computer program product of claim 5, further comprising program code to repeat the counting and storing on all feature points in the target image.

7. The computer program product of claim 6, wherein the program code to repeat the counting and storing on all feature points in the target image includes program code to convert the coordinates (Fx, Fy) of the virtual center point of a maximum number of counted virtual center points to a recognition target image center.

8. The computer program product of claim 7, further comprising program code to establish the coordinate (Fx, Fy) as one recognition target image center and eliminate all of the virtual center points within a predetermined radius (r) of the coordinates (Fx, Fy).

* * * * *